Jan. 5, 1943.    J. G. ZUBER    2,307,345

LENS MOUNT

Filed Sept. 8, 1941

INVENTOR
JOHN G. ZUBER
BY Robert F. Miehle, Jr.
ATTY.

Patented Jan. 5, 1943

2,307,345

UNITED STATES PATENT OFFICE 2,307,345

LENS MOUNT

John G. Zuber, Chicago, Ill., assignor to The Bell & Howell Company, Chicago, Ill., a corporation of Illinois Application September 8, 1941, Serial No. 409,950

7 Claims. (Cl. 88—57)

My invention relates particularly to lens mounts for photographic lenses and has for its general object the provision in a lense mount, involving the usual coöperating shoulder and screwthread, of a novel and effective means which provides for the convenient adjustable positioning of a lens angularly of its axis on a mount for the instant purpose of positioning an adjustment indexing scale of the lens, such as the focusing scale thereof, in position for the convenient observance thereof.

With this object in view, my invention consists in certain features of novelty by which the said object and certain other objects, hereinafter appearing, are effected all as fully described with reference to the accompanying drawing, and more particularly pointed out in the appended claims.

In the said drawing—

Figure 1:
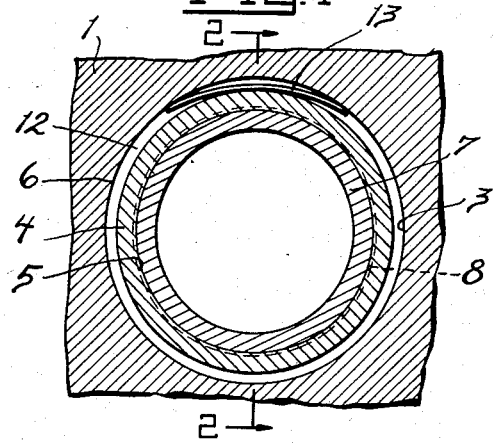
Figure 1 is a sectional view of a lens mount embodying my invention substantially on the line 1—1 of Figure 2.

Referring to the drawing, 1 designates a plate-like support or lens mount member, such as the lens turret plate or wall of a photographic camera. One face surface of the mount member 1 provides a lens mount surface 2, and this mount member is provided with a circular aperture 3 which is normal to the mount surface 2 and is tapered axially thereof to diminish in diameter in the direction outwardly from said mount surface. An annular second lens member 4 has the bore thereof provided with a lens mount screwthread 5 and has the exterior surface 6 thereof tapered axially and correspondingly with the taper of the aperture 3. The mount member 4 has the tapered surface 6 thereof engaged with the tapered aperture 3 of the mount member 1 for the mounting of the mount member 4 in the aperture 3 in cooperative relation with the mount surface 2 of the mount member 1 and for angular adjustment about the axis of the mount member 4, it being noted that the tapered engaging surfaces of the mount members oppose axial movement of the mount member 4 in the direction outwardly from the mount surface 2.

A lens 7 has the rear end of the barrel thereof provided with an external mount screwthread 8 and a rearwardly facing mount shoulder 9 disposed immediately forward of the screwthread 8, thus providing a usual cooperating shoulder and screwthread mounting on the lens. The lens 7 is interchangeably mounted on my mount by engagement of the screwthread 8 thereof with the screwthread 5 of the mount member 4 to engage the shoulder 9 of the lens barrel with the mount surface 2 of the mount member 1, as shown in Figures 2 and 4, the engagement of the tapered surfaces 3 and 6 of the mount members 1 and 4 opposing axial movement of the member 4 in the direction outwardly from the mount surface 2.

Figure 2:
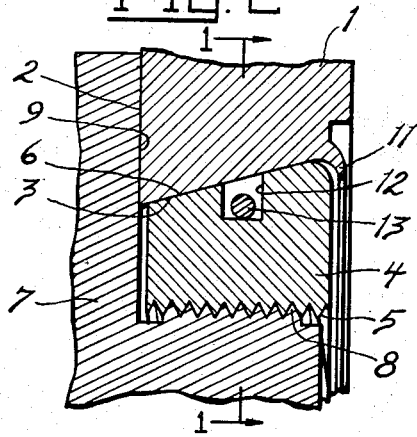
Figure 2 is a partial sectional view of the same substantially on the line 2—2 of Figure 1.
Figure 3:
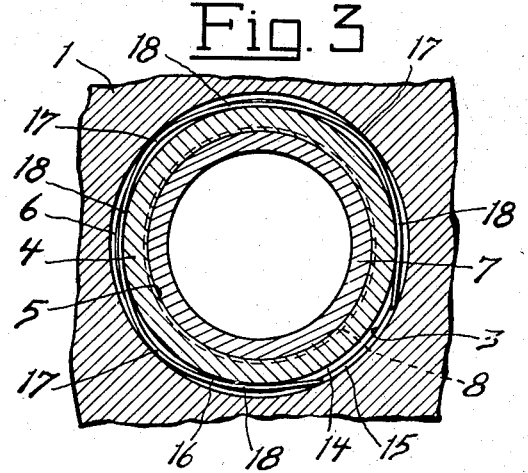
Figure 3 is a sectional view taken similarly to Figure 1 and showing another form of my invention.
Figure 4:
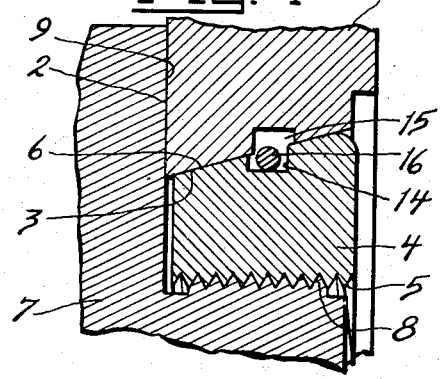
Figure 4 is a sectional view taken similarly to Figure 2 and showing the form of my invention shown in Figure 3.

The forms of my invention shown in Figures 1 and 2 and in Figures 3 and 4 are identical as thus far described and, accordingly, the same reference characters are applied to identical structure.

Referring to Figures 1 and 2, axial movement of the annular mount member 4 in the direction inwardly of the mount surface 2 of the mount member 1 is opposed by a flange 11 on the mount member 1 and disposed in inwardly projecting relation with respect to the aperture 3 and engageable with the rear face of the mount member 4. The annular mount member 4 is provided with an external circumferential groove 12, and a spring member 13 is engaged in and extends along this groove and is tensioned between the mount members 1 and 4 to provide a friction means operative between these mount members to maintain the same in angularly adjusted position.

Referring to Figures 3 and 4, the annular mount member 4 is provided with an external circumferential groove 14, and the surface of the aperture 3 is also provided with a circumferential groove 15. A circular spring 16 is engaged in and extends along the grooves 14 and 15 and is tensioned between the mount members 1 and 4, this spring having the curvature thereof varied at intervals therealong as indicated at 17 and 18 in Figure 3. Thus, the spring 16 serves both to oppose axial movement of the annular mount member 4 in the direction inwardly of the mount surface 2 of the mount member 1 and to provide a friction means operative between the mount members to maintain the same in angularly adjusted position.

Figure 5:
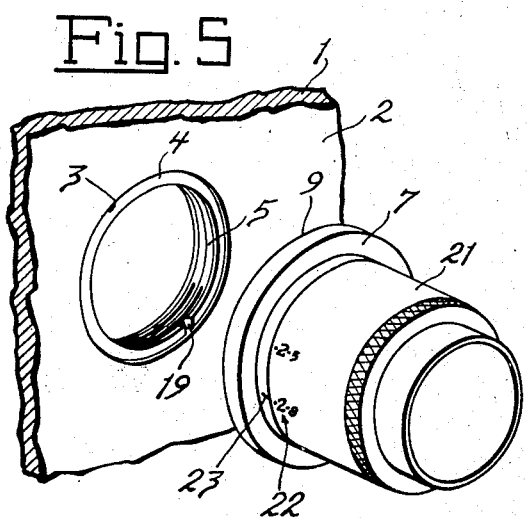
Figure 5 is a perspective view of my lens mount and showing a lens separated from but axially alined therewith and in angular position corresponding with the illustrated adjustment of my lens mount.
Figure 6:
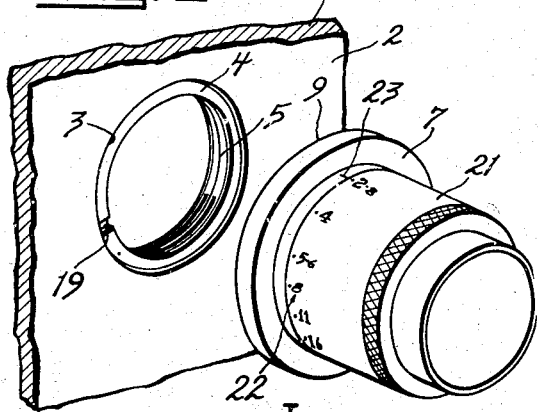
Figure 6 is a view similar to Figure 5 showing a lens angularly positioned to correspond with another adjustment of my lens mount.

The annular mount member 4 may thus be angularly adjusted with reference to the mount member 1, and the front end of the member 4 is provided with a notch 19, see Figures 5 and 6, for conveniently effecting this adjustment. Angular adjustment of the mount member 4 obviously effects correspondingly adjusted angular positioning of the mounted lens 7.

As shown in Figures 5 and 6, the lens 7 is provided with a sleeve 21 angularly adjustable with reference to the lens for focusing the lens, which sleeve is indexed by means of a scale 22 on the sleeve cooperating with an index mark 23 on the lens. In order to have the mounted lens angularly positioned for the convenient observance of the scale 22 and index mark 23, the annular mount member 4 is angularly adjusted. Figure 5 shows the mount member 4 adjusted for the angular position of the mounted lens as shown in this figure, and Figure 6 shows the mount member 4 adjusted in another position for another angular position of the mounted lens as shown in the latter figure.

The adjusted angular position of the annular mount member 4 is maintained during mounting and dismounting of the lens by the friction means operative between the mount members 1 and 4 and exemplified by the spring 13 of Figures 1 and 2 and by the spring 16 of Figures 3 and 4. When the shoulder 9 of the lens is engaged with the mount surface 2 of the mount member 1, the engaged tapered surfaces of the mount members 1 and 4 are drawn into wedging engagement, thus preventing angular displacement of the mount member 4 by reason of torque applied to the lens.

While I have thus described my invention, I do not wish to be limited to the precise details described, as changes may be readily made without departing from the spirit of my invention, but having thus described my invention, I claim as new and desire to secure by Letters Patent the following:

1. In a lens mount, the combination of two lens mount members one of which is provided with a lens mount surface and the other of which is provided with a lens mount screwthread, and means carrying said mount member in cooperative relation and for relative angular adjustment thereof about the axis of said screwthread and comprising a tapered bearing operative between said mount members and opposing axial movement of said screwthreaded member in the direction outwardly from said mount surface.

2. In a lens mount, the combination of two lens mount members one of which is provided with a lens mount surface and the other of which is provided with a lens mount screwthread, means carrying said mount members in cooperative relation and for relative angular adjustment thereof about the axis of said screwthread and comprising a tapered bearing operative between said mount members and opposing axial movement of said screwthreaded member in the direction outwardly from said mount surface, and friction means operative between said mount members to maintain the same in angularly adjusted position.

3. In a lens mount, the combination of a lens mount member provided with a lens mount surface and an aperture normal to said surface, and an annular second lens mount member having the bore thereof provided with a lens mount screwthread and mounted in said aperture in cooperative relation with said mount surface and for angular adjustment about the axis of annular member, at least one of the engaging surfaces of said lens mount members being tapered axially of said annular member and opposing axial movement of said annular member in the direction outwardly from said mount surface.

4. In a lens mount, the combination of a lens mount member provided with a lens mount surface and an aperture normal to said surface, an annular second lens mount member having the bore thereof provided with a lense mount screwthread and mounted in said aperture in cooperative relation with said mount surface and for angular adjustment about the axis of said annular member, one of the engaging surfaces of said lens mount members being provided with a groove extending angularly about the axis of said annular member, and a spring member engaged in and extending along said groove and tensioned between said mount members.

5. In a lens mount, the combination of a lens mount member provided with a lens mount surface and an aperture normal to said surface, an annular second lens mount member having the bore thereof provided with a lens mount screwthread and mounted in said aperture in cooperative relation with said mount surface and for angular adjustment about the axis of said annular member, the engaging surfaces of said lens mount members being correspondingly tapered axially of said annular member and opposing axial movement of said annular member in the direction outwardly from said mount surface, one of the engaging surfaces of said lens mount members being provided with a groove extending angularly about the axis of said annular member, and a spring member engaged in and extending along said groove and tensioned between said mount members.

6. In a lens mount, the combination of a lens mount member provided with a lens mount surface and an aperture normal to said surface, an annular second lens mount member having the bore thereof provided with a lense mount screwthread and mounted in said aperture in cooperative relation with said mount surface and for angular adjustment about the axis of said annular member, the engaging surfaces of said lens mount members being correspondingly tapered axially of said annular member and opposing axial movement of said annular member in the direction outwardly from said mount surface, a flange on said first mentioned mount member disposed in inwardly projecting relation with respect to said aperture and engageable with said annular member to oppose axial movement of said annular member in the direction inwardly of said mount surface, said annular member having an external groove extending angularly about the axis thereof, and a spring member engaged in and extending along said groove and tensioned between said mount members.

7. In a lens mount, the combination of a lens mount member provided with a lens mount surface and an aperture normal to said surface, an annular second lens mount member having the bore thereof provided with a lens mount screwthread and mounted in said aperture in cooperative relation with said mount surface and for angular adjustment about the axis of said annular member, the engaging surfaces of said lens mount members being correspondingly tapered axially of said annular member and opposing axial movement of said annular member in the direction outwardly from said mount surface, the engaging surfaces of said lens mount members being provided with grooves extending angularly about the axis of said annular member, and a spring member engaged in and extending along said grooves and tensioned between said mount members.

JOHN G. ZUBER.